US006326882B1

United States Patent
Chiu et al.

(10) Patent No.: US 6,326,882 B1
(45) Date of Patent: Dec. 4, 2001

(54) APPARATUS AND METHOD FOR CONTROLLING A VENTILATION DEVICE

(76) Inventors: Tai-Chieh Chiu, 13F-1, No. 626, Kwang-Fu South Rd; Kun Feng Lin, 37 Lane 268, Fu-Teh Road, both of Taipei (TW)

( * ) Notice: Subject to any disclaimer, the term of this patent is extended or adjusted under 35 U.S.C. 154(b) by 0 days.

(21) Appl. No.: 09/643,401

(22) Filed: Aug. 22, 2000

(51) Int. Cl.$^7$ .................................................... G08B 1/00
(52) U.S. Cl. ................ 340/309.15; 361/695; 307/132 R; 454/256
(58) Field of Search .............................. 340/309.15, 661; 361/694, 695; 307/141, 132 R; 368/1, 10; 454/256, 229, 239; 200/297, 314; 318/445

(56) References Cited

U.S. PATENT DOCUMENTS

| | | | |
|---|---|---|---|
| 5,189,412 | * | 2/1993 | Mehta ........................... 340/825.22 |
| 5,289,157 | * | 2/1994 | Rudick ........................... 340/309.15 |
| 5,722,887 | * | 3/1998 | Wolfson ............................. 454/256 |
| 6,084,504 | * | 7/2000 | Rosche ........................... 340/309.15 |

* cited by examiner

*Primary Examiner*—Jeffery Hofsass
*Assistant Examiner*—Anh La
(74) *Attorney, Agent, or Firm*—Senniger, Powers, Leavitt & Roedel (57) ABSTRACT

The invention provides a method and apparatus for controlling a ventilation device. When the power switch of a room is turned on, the light of the room is turned on and the fan of the room is also turned on. When the power switch is turned off the light goes off, the automatic controlled fan still works for a predetermined amount of time (say, 5 minutes) and then shuts off automatically. If later the room is not being used, the automatic controlled fan will automatically repeat turning on and off (only turned on for a short time say, 5 minutes) periodically according to a set interval (say, repeat every 30 minutes). By the above automatic control of the ventilation fan, the bad odors or humid air in the room can be removed. If the room is not used for a longer period of time (say, 12 hours), the automatic controller enters sleep mode and the sleep timer will shut off the automatic repeat on/off function. In sleep mode, the fan won't be automatically turned-on/off to save energy assuming that the humid air in the room is well ventilated. With the user-friendly and energy saving automatic control features over the ventilation fan, the user can enjoy a better living quality.

11 Claims, 6 Drawing Sheets

APPARATUS AND METHOD FOR CONTROLLING A VENTILATION DEVICE

BACKGROUND OF THE INVENTION

1. Field of the Invention

The invention relates to a method and apparatus for controlling a ventilation device, and in particular to a method and apparatus for controlling a ventilation device in a bathroom, restroom or warehouse.

2. Reference to Prior Application

This application has been filed in the R.O.C. (Taiwan) as Patent Application No. 08921002 May 8, 2000 and Patent Application No. 089209524 on Jun. 2, 2000 respectively.

3. Description of the Related Art

In a conventional bathroom, restroom or warehouse design, in order to improve the air quality, ventilation fans will be installed to work in parallel with the rooms' lights. If the light of a room (bathroom, restroom, or warehouse room) is turned on by a user, the fan in that room is also turned on to ventilate the room. The ventilation fan can expel bad odors and humid air from the room when the room is being used and the light in the room is turned on. If the user leaves the room, the light power switch is turned off and the fan is also turned off, but the remaining bad odors and humid air cannot be expelled from that room. So, the conventional design has only limited effect in improving the air quality in those rooms.

Figure 1:
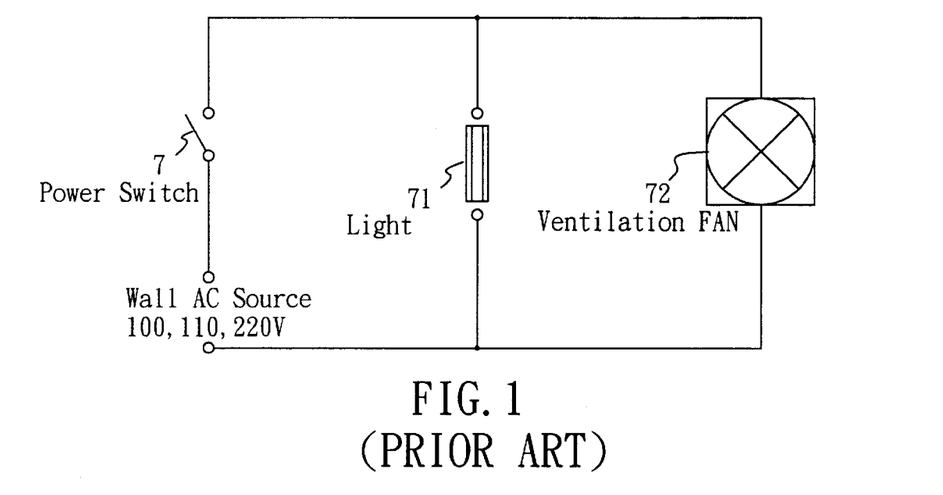
FIG. 1 illustrates a schematic diagram of a conventional ventilation device provided in a bathroom.

Please refer to FIG. 1. If the user leaves a room (bathroom, restroom, or warehouse room), without turning off the Power Switch 7 of the Ventilation Fan 72, the Light 71 in the room will also be left turned on. If the user wants to turn off the Power Switch 7 after making sure that the bad odors are expelled, then it causes inconvenience to the user. If the user forgets the working condition of the Ventilation Fan 72 or simply lets the Power Switch 7 stay always turned on, that will cause the electricity to be wasted and the electricity bill to increase. That will also wear out the fan and the light in that room.

SUMMARY OF THE INVENTION

From the above deficiencies, the Inventor uses his electronic experiences, through careful study and modifications, to successfully accomplish this invention.

An aspect of this invention is to provide a control apparatus that is a kind of Automatic Delay-Off and Timer-On/Off Control over ventilation fan to improve the air condition in a room (bathroom, restroom, or warehouse room). Please refer to FIG. 2. One Automatic Control Box 73 is added in between the Fan 72 and the Light 71 to provide automatic control as described below: When the Light 71 in a room is turned on, the Ventilation Fan 72 will also be turned on. When the Power Switch 7 is turned off the Light 71 goes off, but the Automatic Control Box 73 will let the Ventilation Fan 72 work until a fixed set time (say, 5 minutes) and then turn off automatically. If later the room is not being used by the user, the Automatic Control Box 73 will automatically repeat turning on and off the Ventilation Fan 72 (only turns on for a short time say, 5 minutes) periodically according to the set interval (say, repeat every 30 minutes).

Figure 2:
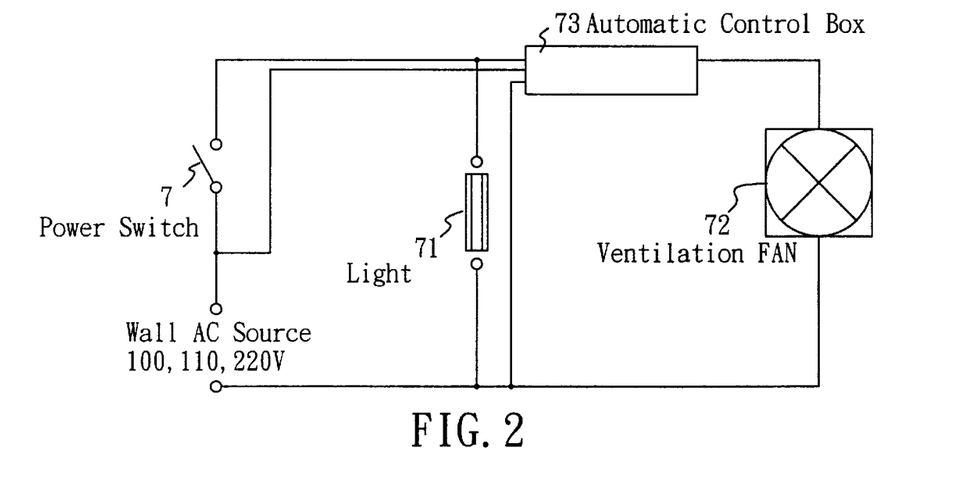
FIG. 2 illustrates a schematic diagram of a ventilation device with a control apparatus of the present invention.

By the above automatic control over the Ventilation Fan 72, the bad odors and humid air in the room can be removed. If the room is not used after a longer period of time (say, 12 hours), the Automatic Control Box 73 enters sleep mode, the sleep timer will shut off the automatic repeat on/off function. In sleep mode, the Ventilation Fan 72 won's be automatically turned-on/off to save energy assuming that the humid air in the room is well ventilated. No matter whether the Automatic Control Box 73 is in sleep mode or not, whenever the user re-enters the room, the Ventilation Fan 72 will be turned on with the Light 71 by Power Switch 7, and all the above automatic control functions can be repeated to keep the room smelling good. So, the purpose of this invention, namely to ventilate the bad odors and humid air in a room, can be accomplished by the above Automatic Control Box 73.

It is another aspect of the invention to provide an ASIC (Application Specific Integrated Circuit) that implements the control apparatus of the invention therein.

It is another aspect of the invention to provide a method for controlling a ventilation device in the bathroom, restroom or warehouse.

It is another aspect of the invention to provide a computer-readable recording medium encoded with a computer software which is performing the above method.

BRIEF DESCRIPTION OF THE DRAWINGS

For a more complete understanding of the present invention and the advantages thereof, reference is now made to the following descriptions taken in conjunction with the accompanying drawings which illustrate the embodiments of the present invention, wherein:

FIG. 3a in combination with FIG. 3c illustrates a block diagram of another embodiment of the control apparatus of the present invention.

DETAILED DESCRIPTION OF THE PREFERRED EMBODIMENT

Figure 3A:
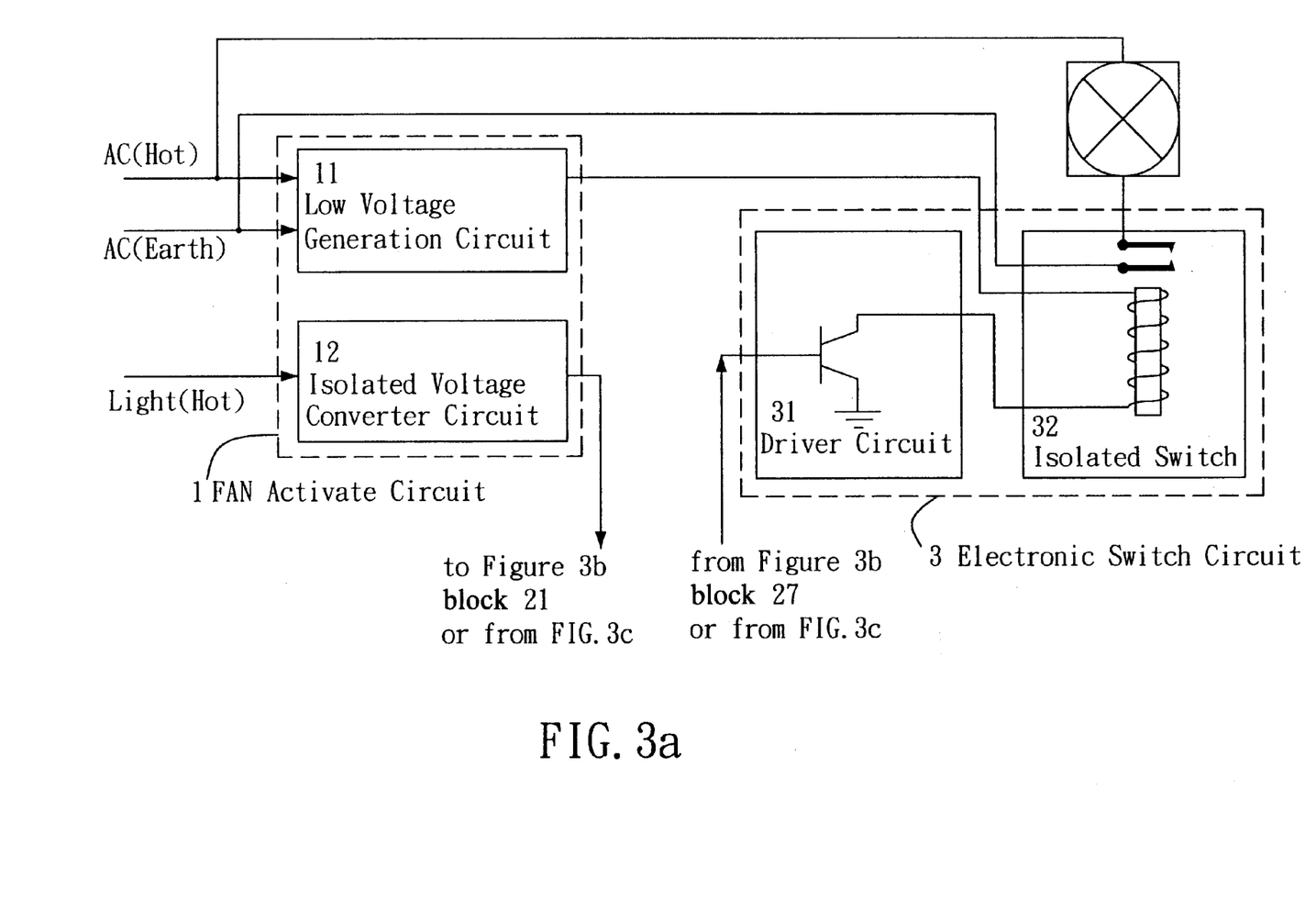
FIG. 3a in combination with FIG. 3b illustrate block diagrams of the control apparatus of the present invention.
Figure 3B:
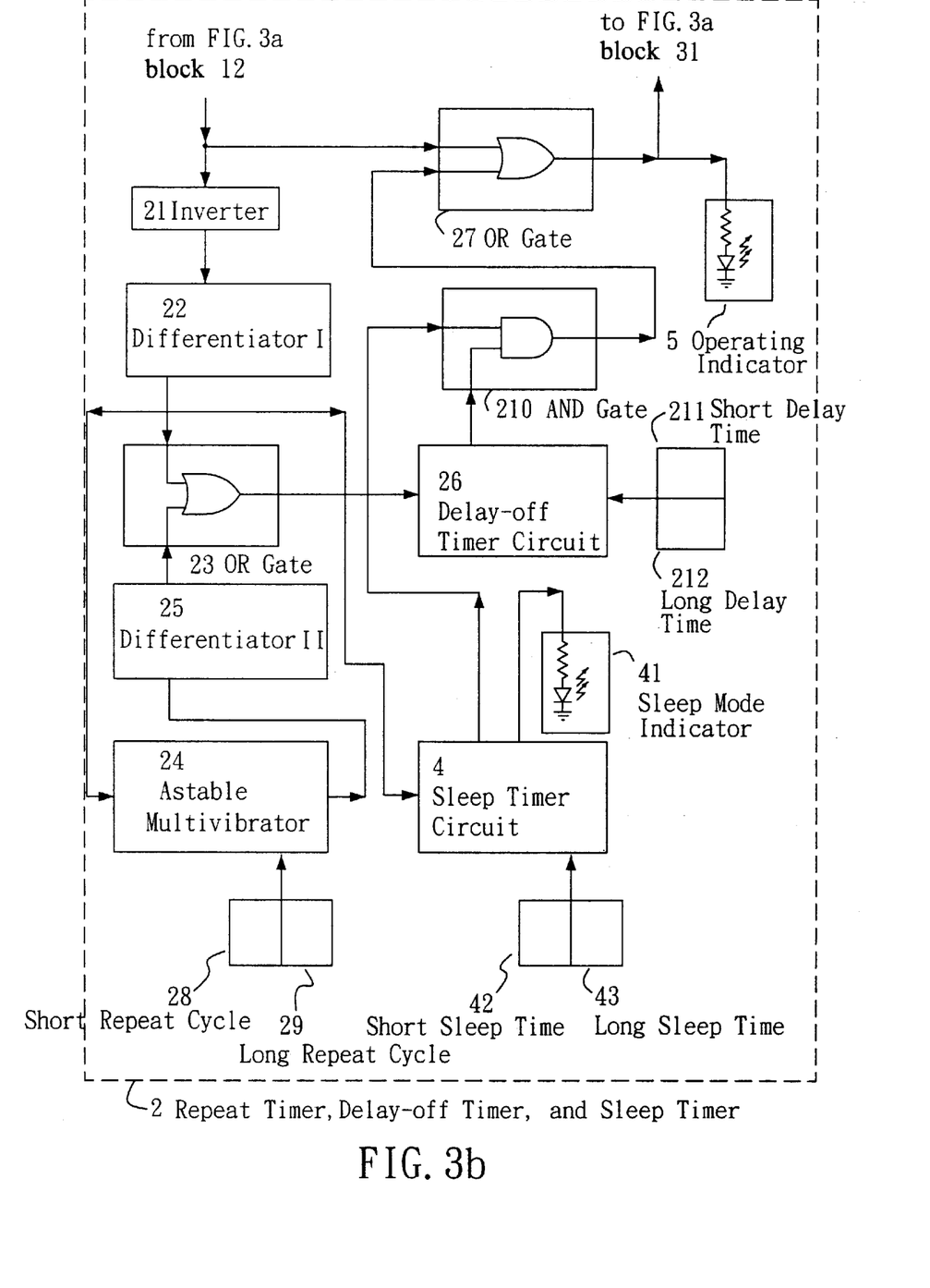
Figure 5:
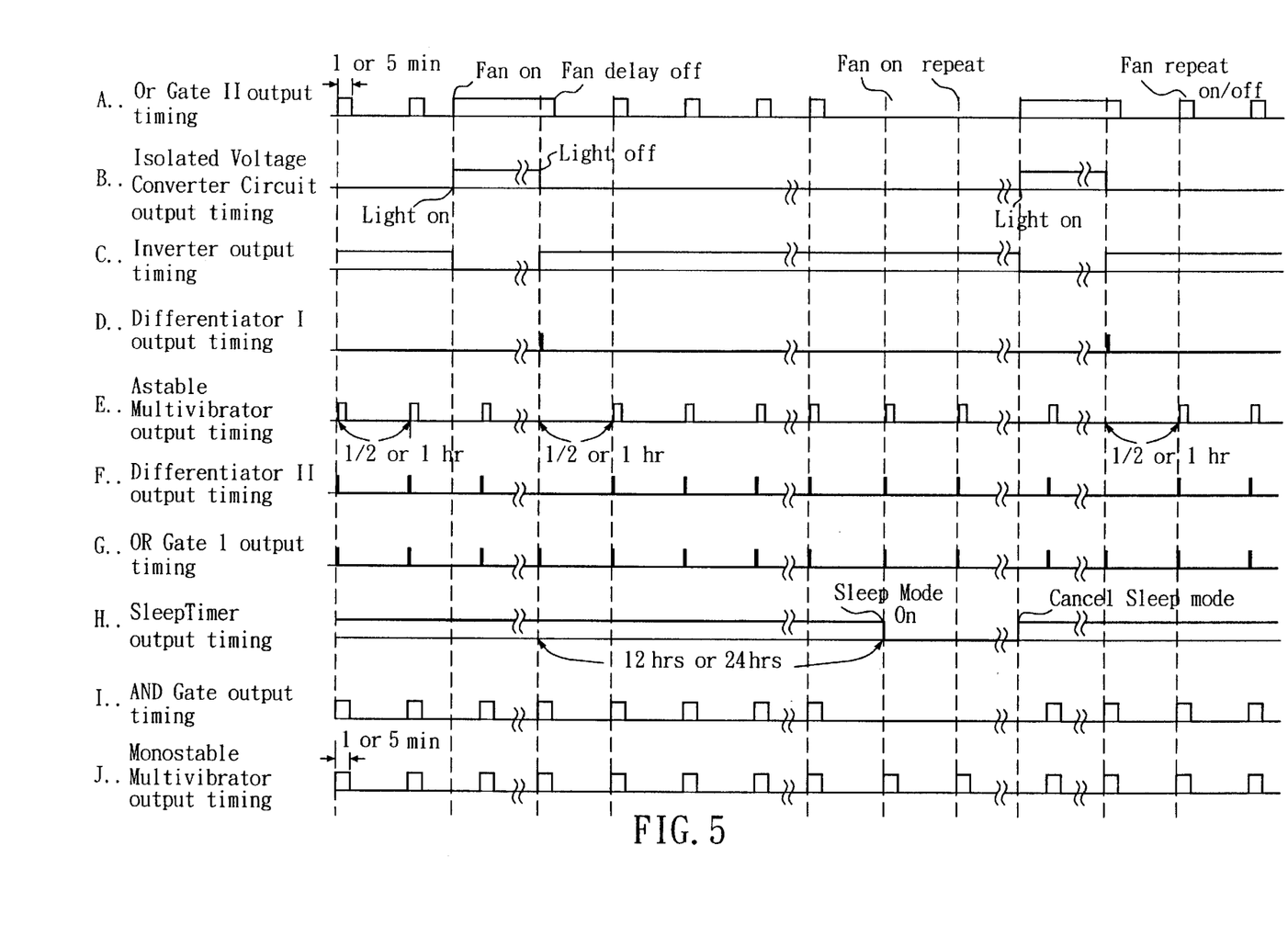
FIG. 5 illustrates a timing diagram of the elements of the control apparatus of the present invention illustrated in FIG. 3a in combination with FIG. 3b.

In order to facilitate the examining officials better understanding the contents of this invention and how it can be achieved, the inventor provided a physical H/W design example (as shown in FIG. 3a in combination with FIG. 3b and FIG. 5) and a Micro Processor software example (as shown in FIG. 3a in combination with FIG. 3c and FIG. 4) on how the invention can be accomplished as follows:

Please refer to FIG. 3a and 3b and FIG. 5. This invention is mainly composed of a Ventilation Device Activating circuit (such as Fan Activating circuit) 1, a First Timer (such as Delay-off Timer Circuit or Monostable Timer) 26, a Second Timer (such as Repeat Turn-on/off Timer Circuit or Astable Timer) 24, a Third Timer (such as Sleep Timer Circuit) 4, and an Electronic Switch Circuit 3.

The so called Fan Activating circuit 1 is composed of two circuits: One is Low Voltage Generation Circuit 11. It converts common wall power outlet voltage to a low voltage (say, 5 V) to supply all the electronic circuits in this invention. The other circuit is an Isolated Voltage Converter Circuit 12. The purpose of the Isolated Voltage Converter Circuit 12 is to convert the room light power switch signal to a low level isolated signal as an indication of the light status. For example, if the room light is turned on, the output of the isolated voltage converter 12 will be high (say, 5 V) and if the room light is not turned on, the output will be low (say, 0 V). The timing representation of that output is on FIG. 5, line B.

The so called Repeat Timer, Delay-off Timer, and Sleep Timer 2 is mainly composed of Repeat Turn-on/off Timer Circuit 24, Delay-off Timer Circuit 26, and Sleep Timer Circuit 4. The low level Light status signal from FIG. 3a Isolated Voltage Converter Circuit 12 is fed to the Inverter 21. The output timing of the inverter 21 is shown on FIG. 5, Line C. The inverted signal then passes the Differentiator 22 to generate a positive edge pulse as shown on FIG. 5 Line D. It is then fed to one of the inputs of OR Gate 23. An Astable Multi-vibrator 24 generates repeat cycles according to the optional settings (say, ½ hour Short Repeat Cycle 28, or 1 hour Long Repeat Cycle 29). The Astable Multi-vibrator 24 is reset and restarted to count whenever the light power switch is turned off. The output of Astable Multi-vibrator 24 is shown of Figure line E. It then feeds to another Differentiator 25 and generates a series of short pulses as shown on FIG. 5, line F. Those short pulses then feed to the other input of the OR gate 23. The output of the OR Gate 23 is shown on FIG. 5, line G. That output then fees to the Monostable Multi-vibrator 26. The output Monostable Multi-vibrator 26 is shown on FIG. 5 line J. The Monostable Multi-vibrator 26 can be designed to have two optionally different lengths of delay-off time (say, 1 minute Short Delay Off 211, or 5 minutes Long Delay Off 212). A Sleep Timer Circuit 4 can be designed to have two optionally different time limits (say, 12 hours Short Sleep Timer 42, or 24 hours Long Sleep Time 43). The Sleep Timer 4 is started/reset to count whenever the light power switch is turned off. The output of Sleep timer circuit 4 is shown on FIG. 5, line H. It then feeds to one of the inputs of the AND Gate 210. The other input of the AND Gate 210 is from the output of Monostable Multi-vibrator 26. The AND Gate output is shown on FIG. 5 line I. It shows clearly that in the sleep mode (FIG. 5 line H in low state), the output of the AND Gate 210 can no longer send out repeat turn-on/off signals from Astable Multi-vibrator 24. In sleep mode the Sleep Mode Indicator 41 will be turned on.

Finally the output of the AND Gate 210 is send to OR Gate 27. Another input of the OR Gate 27 is from the output of Isolated Voltage Converter Circuit 12 (FIG. 5 line B). The output of the OR Gate 27 is shown on FIG. 5, line A. It forms a complete low level automatic control signal for the Ventilation Fan 72.

The so called Electronic Switch Circuit 3 is composed of an Isolated Switch 32 and a Driver Circuit 31 to drive Isolated Switch 32. When the low level automatic control signal shown on FIG. 5, line As in "high" state to turn on the Driver Circuit 31, the Driver Circuit 31 then turns on the Isolated Switch 32. The wall outlet power then is provided to the Ventilation Fan 72 and makes it run. When the Ventilation Fan 72 is running, the Operating Indicator 5 is also turned on to indicate the status of Ventilation Fan 72. When the state of low level automatic control signal is in "low" state, it turns off the Driver Circuit 31. The Driver Circuit 31 then turns off the Isolated Switch 32 and then stops the Ventilation Fan 72 and the Operating Indicator 5 is also turned off.

From the above analysis, no matter if the automatic controller is in sleep mode, whenever the light is turned on, the Ventilation Fan 72 will be turned on. Whenever the light is turned off, the Ventilation Fan 72 will automatically be delayed (say, 1 minute or 5 minutes) to be turned off. The Ventilation Fan 72 will be turned on for a short time (say, 1 minute or 5 minutes) periodically (say, ½ hour or 1 hour) before the sleep timer changes state (say, 12 hours or 24 hours) and enters sleep mode. When the automatic controller enters sleep mode, the Ventilation Fan 72 will not be turned on/off periodically to save electricity. On end product design, the Isolated Voltage Converter Circuit 12 and Isolated Switch 32 can be simplified to fulfill their jobs without the isolation function to reduce cost and make this invention cheaper for public. In addition, the control apparatus of the present invention can be implemented in an ASIC to further reduce the cost.

Figure 3C:
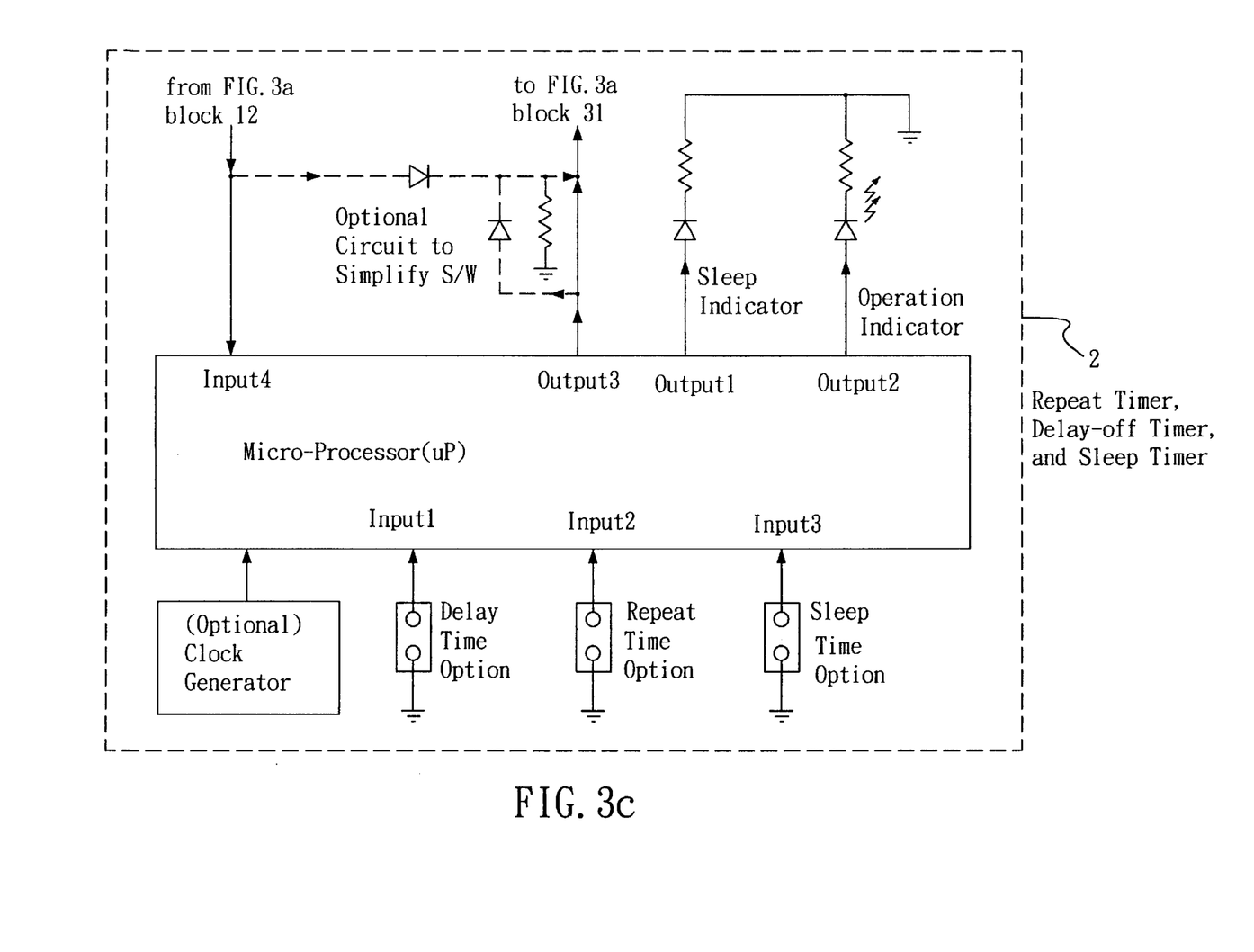

Another way to implement this invention is to use software with micro-process to simplify hardware components. Please refer to FIG. 3a, and FIG. 3c, and FIG. 4. The circuit on FIG. 3a is connected to FIG. 3c to use a Micro-Processor (uP). Please refer to the previous paragraphs for the operation on FIG. 3a part of circuits. In FIG. 3c, the uP handles all the functions in FIG. 3b including Delay Timer, Repeat Timer, and Sleep Timer and two optional indicators, optional delay time setting, optional repeat time setting and optional sleep time setting.

Figure 4:
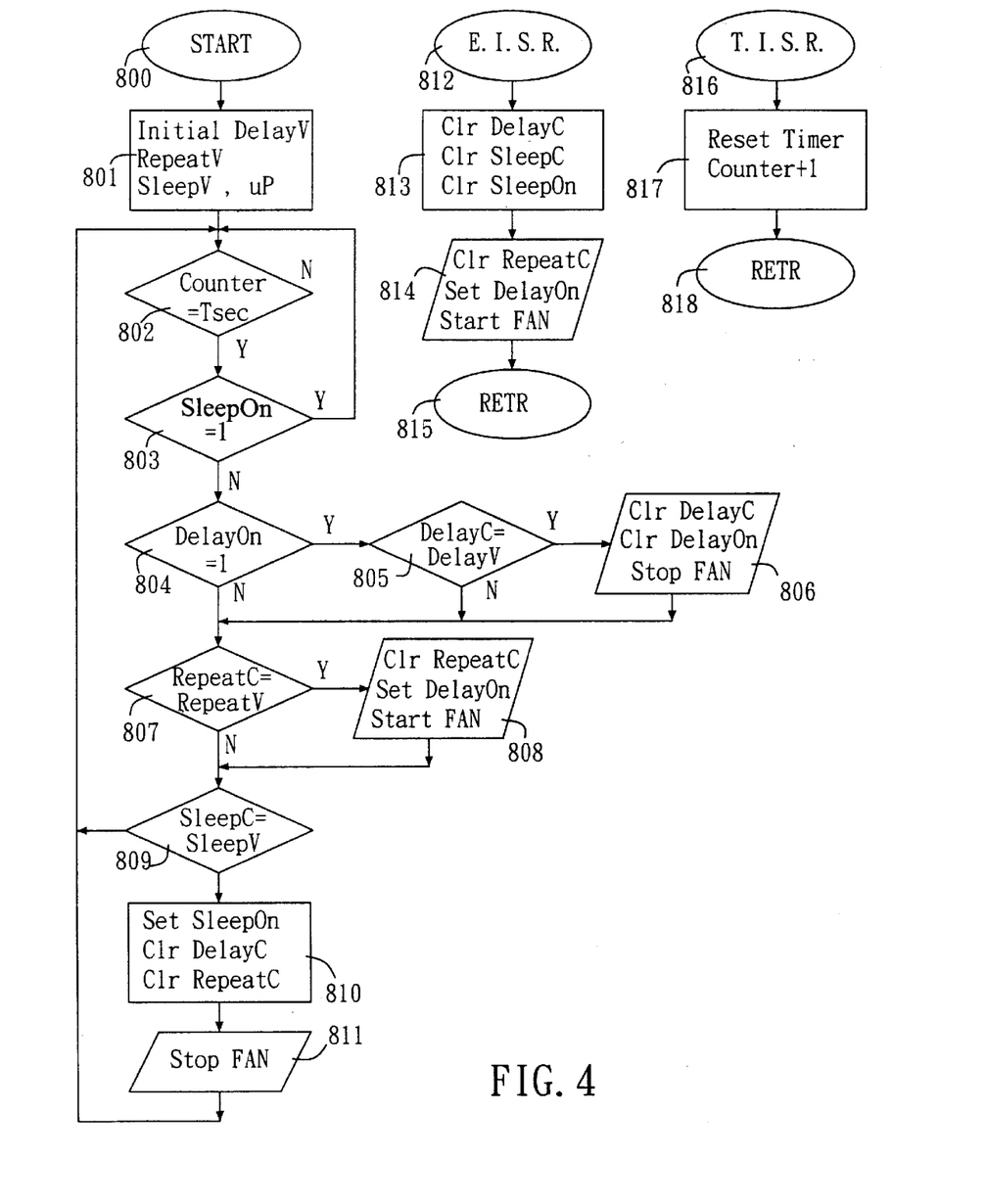
FIG. 4 illustrates a flow chart of a method performing the embodiment of the present invention illustrated in FIG. 3a in combination with FIG. 3c.

Program inside a uP starts from block 800. Then it executes process 801 to initialize uP hardware and sets variable used in this program by reading optional input pins.

After the process 801, the uP H/W internal timer will be setup and started to count and generate fixed period interrupts repeatedly to calibrate all three timers: Delay Timer, Repeat Timer, and Sleep Timer. When a H/W timer interrupts, The T.I.S.R. (Timer H/W Interrupt Service Routine) will be executed to add one to a variable (say, Counter). Also after the process 801, the H/W interrupt pin will be enabled to accept the change of conditions on the Light 71. Whenever the Light 71 is turned off, the E.I.S.R (External-pin H/W Interrupt Service Routine) section program will be executed.

Three main variable are DelayV, RepeatV, and SleepV for three main timers (Delay Timer, Repeat Timer, and Sleep Timer). The DelayV is set according to the Input1 pin status. Since the pin 1 has two states (hi and low), two different lengths of delay-off time can be set. One is long delay-off time (say, 5 minutes corresponds to FIG. 3b block 212) and the other is short delay-off time (say, 1 minute corresponds to FIG. 3b block 211). The RepeatV can also be set to two different lengths of repeat cycle time set by Input2 pin. One is long repeat cycle (say, 1 hour correspond to FIG. 3b block 29) and another is short repeat cycle (say, half an hour corresponding to FIG. 3b block 28). The Input3 pin can set the time before entering the Sleep mode. The SleepV can be set long (say, 24 hours corresponding to FIG. 3b block 43) or short (say, 12 hours corresponding to FIG. 3b block 42). Later there are some comparison check blocks that use these variables to direct the way the program goes.

After block 801 the program enters the process 802 to check if a fixed time is reached. The T.I.S.R. will continue to add one to the variable (say, Counter) on the background. In process 802, if the variable (say Counter) is not yet reached a fixed time (say, T seconds), the process 802 will continue to loop back to re-run the process 802. The reason for this variable (say, Counter) and loop back re-run to temporarily keep the program in this process 802 loop is to generate a longer fixed time (longer than the H/W Timer interrupt fixed repeat time) to make later three main timers (Delay Timer, Repeat Timer, and Sleep Timer) easier to calculate. This block 802 can be saved and still fulfill the same functions, if the later three main timers can count long time intervals.

If a longer fixed time is reached (say, T seconds), program will reset the variable (say, reset Counter) and start to execute process 803. In process 803, if it is not in sleep mode (say, SleepOn flag is not set), the program can not go down to process 804. If in sleep mode (say, SleepOn flag is set), the program will loop back to start process 802 again. The only way for program to go down to process 804 is that a user turns on or off the Light 71 and triggers the H/W interrupt input pin and then the E.I.S.R. is executed to leave sleep mode (say, clear SleepOn flag).

When the Light 71 is turned on or off by the user, the E.I.S.R. is then immediately executed and the program enters the Delay-off mode (say, DelayOn flag is set). The process 804 checks the Delay-off mode. If Automatic Control Box 73 is in Delay-off mode, the program goes to process 805. If Automatic Control Box 73 is not in Delay-off mode, the program goes to process 807.

In Process 805, the program first adds one to variable DelayC. If Automatic Control Box 73 is in Delay-off mode (DelayOn is set) and has not yet reached the Delay Time (DelayV variable set by Input1 pin), the program will go to process 807. If Automatic Control Box 73 is reaching Delay Time setting (say, DelayC=DelayV), the program will go to process 806 to reset DelayC variable and stop Ventilation Fan 72 and clear DelayOn flag then goes to process 807.

In Process 807, the program first adds one to variable RepeatC. If Automatic Control Box 73 is not yet reached the Repeat Time (RepeatV variable set by Input2 pin), the program will go to process 809. If Automatic Control Box 73 is reaching Repeat Time setting (say, RepeatC=RepeatV), the program will go to process 808 to reset RepeatC variable and enters Delay-off mode (say, set DelayOn flag), and starts Ventilation Fan 72 and then goes to process 809.

In Process 809, the program first adds one to variable SleepC. If Automatic Control Box 73 is not yet reached the Sleep Time (SleepV variable set by Input3 pin), the program will go back to process 802. If Automatic Control Box 73 is reaching Sleep Time setting (say, SleepC=SleepV), the program will go to process 810 to reset SleepC, DelayC, and RepeatC variables, enters Sleep mode (say, set SleepOn flag), goes to process 811 to stop Ventilation Fan 72 and then goes to process 802.

The E.I.S.R. will be executed when the Light 71 is turned on or off and started from block 812 the program will cancel the Sleep mode (say, clear SleepOn flag), enter Delay-off mode (say, set DelayOn flag), clear DelayC and RepeatC and SleepC variables and then go to process 814 to start Ventilation Fan 72. After that, the program will go to block 815 to return from E.I.S.R. to main program.

The T.I.S.R. will be executed when H/W Timer Interrupt has occurred. It starts from block 816 and then goes to process 817 to reset H/W Timer to make it start again and add one to the variable Counter, then goes to block 818 to return from T.I.S.R. to main program.

The above main program continues to loop again and again. The two subroutines with main program can do all three main Timer functions interacted with the input status of Light 71.

The H/W Interrupt function on uP input pin for Light 71 conditions in the end product can be omitted by changing the software design to reduce cost. Another way to reduce cost is to omit the H/W Timer interrupt function by changing software design. The above two ways can be used to provide a cheaper product for public by using a simpler uP. The two diodes connected close to Output3 can be omitted if the software program is changed to make the uP do the "OR" function in the software. The sample software program block diagram is just one way to implement three main automatic functions (Delay-off, Repeat-on/off, Sleep-off saving). It can be further improved to implement the same functions.

Programs can practice the above method. The programs can be loaded into a computer or a programmable information processor to execute the function of the flow chart of FIG. 4. The programs can be stored into a computer-readable medium (for example, magnetic memory or IC memory, etc) to be used to into the computer. Therefore, the invention further discloses a computer-readable medium recording computer-executable programs for the method of the invention.

<Comparison>

In order to make clear the advances and usefulness of this invention, a short description of the deficiencies of the conventional ventilation fan in a room (restroom, bathroom, or warehouse room) is provided as follows:

(1). In many cases, the conventional design fan can't get rid of bad odors or humid air, since the Ventilation fan is turned on and off along with the room light.

(2). It is not very useful for the next user of the restroom or bathroom, since the bad odors or humid air might still be remained inside the room.

(3). It is not an advanced design. If the user wants to prolong the ventilation time by simply leaving the power on, the user must remember to go back to the room to turn off the power later. It is inconvenient to the user.

(4). It is not an advanced design, if the user wants to prolong the ventilation time, he can leave the power always on, and it is easy for the user to forget the status of the fan. It causes the wasting of electrical power and money as well as the wearing out the fan and light.

The advantages of this invention are as follows:

(1). It can improve the living environment for the user. The advanced user-friendly automatic design can reduce bad odors and humid air in the room (restroom, bathroom, or warehouse room). It can improve the living environment for the user.

(2). The advanced user-friendly automatic design can save the user the inconvenience of monitoring/checking the FAN and Light status of the room.

(3). The advanced user-friendly automatic design can save energy and money, because it can automatically turns on the fan without turning on the light to ventilate the room.

(4). It is suitable for home use and some industrial applications and is able to provide with indicators to show the status of the fan.

In conclusion, from the above comparisons, this invention is much more advanced and useful than the conventional design. It is not found on the market, so the inventor is applying for a patent.

Although the present invention and its advantages has been described in detail, it should be understood that various changes, substitutions and alternations can be made herein without departing from the spirit and scope of the invention as defined by the appended claims.

What is claimed is:

1. A control apparatus for controlling a ventilation device, the control apparatus being coupled between a power source having a power switch and the ventilation device, comprising:

an activating circuit, coupled to the power source, for generating a first activating signal when the power switch is turned on;

an electronic switch circuit, coupled to the activating signal, for activating the ventilation device;

a first timer, coupled to the activating circuit, for generating a second activating signal when the power switch is turned off, the second activating signal being coupled to the electronic switch circuit to activate the ventilation device for a first predetermined time period; and a second timer, coupled to the activating circuit, for periodically generating a third activating signal having a second predetermined time period when the power switch is turned off, the third activating signal being coupled to the electronic switch circuit to periodically activate and deactivate the ventilation device.

2. The control apparatus as claimed in claim 1, further comprising a third timer, coupled to the activating circuit, for generating a fourth activating signal when the power switch is turned off, the fourth activating signal being coupled to the electronic switch circuit to deactivate the ventilation device after a third predetermined time period has been elapsed.

3. The control apparatus as claimed in claim 2, wherein the second predetermined time period is greater than the first predetermined time period and the third predetermined time period is greater than the second predetermined time period.

4. The control apparatus as claimed in claim 1, wherein the control apparatus is implemented by commercial ICs or an ASIC.

5. The control apparatus as claimed in claim 1, further comprising an optional operating indicator for indicating that the ventilation device is operating or an optional sleep mode indicator for indicating that the control apparatus is in a sleep mode.

6. The control apparatus as claimed in claim 1, wherein the activating circuit further comprises a low voltage generation circuit and an isolated voltage converter circuit.

7. The control apparatus as claimed in claim 1, wherein the electronic switch circuit further comprises a driver circuit and an isolated switch.

8. The control apparatus as claimed in claim 1, wherein the first timer is a monostable timer and the second timer is an astable timer.

9. The control apparatus as claimed in claim 1, wherein the first timer and the second timer are reset when the power switch is turned on then off again.

10. The control apparatus as claimed in claim 2, wherein the third timer is reset when the power switch is turned on or off again.

11. The control apparatus as claimed in claim 1, wherein a light is turned on when the power switch is turned on.

* * * * *